US010609294B2

(12) United States Patent
Cooper et al.

(10) Patent No.: US 10,609,294 B2
(45) Date of Patent: Mar. 31, 2020

(54) SYSTEMS AND METHODS FOR SAMPLING IMAGES

(71) Applicant: X Development LLC, Mountain View, CA (US)

(72) Inventors: Emily Cooper, Mountain View, CA (US); Chad Talbott, Mountain View, CA (US)

(73) Assignee: X Development LLP, Mountain View, CA (US)

( * ) Notice: Subject to any disclaimer, the term of this patent is extended or adjusted under 35 U.S.C. 154(b) by 33 days.

(21) Appl. No.: 15/851,901

(22) Filed: Dec. 22, 2017

(65) Prior Publication Data
US 2019/0199902 A1 Jun. 27, 2019

(51) Int. Cl.
*H04N 5/235* (2006.01)
*H04N 5/243* (2006.01)

(52) U.S. Cl.
CPC ......... *H04N 5/2352* (2013.01); *H04N 5/2351* (2013.01); *H04N 5/2356* (2013.01); *H04N 5/2353* (2013.01); *H04N 5/243* (2013.01); *Y10S 901/47* (2013.01)

(58) Field of Classification Search
CPC .... H04N 5/2352; H04N 5/2356; H04N 5/243; H04N 5/2353; H04N 5/353; Y10S 901/47
USPC .................................. 348/223.1–229.1, 362
See application file for complete search history.

(56) References Cited

U.S. PATENT DOCUMENTS

| | | | | |
|---|---|---|---|---|
| 2008/0186387 | A1* | 8/2008 | Iwamoto | H04N 5/2353 348/222.1 |
| 2010/0059589 | A1* | 3/2010 | Goncalves | G06K 9/00771 235/383 |
| 2012/0311189 | A1* | 12/2012 | Yamada | G06F 21/6272 709/248 |
| 2015/0199824 | A1* | 7/2015 | Kim | G06K 9/00355 382/103 |
| 2017/0078351 | A1* | 3/2017 | von Sneidem | H04L 65/602 |
| 2017/0113342 | A1* | 4/2017 | Abramson | G05D 1/0225 |
| 2018/0191938 | A1* | 7/2018 | Pena De Sousa Santos | G06K 9/00134 |

* cited by examiner

*Primary Examiner* — Yogesh K Aggarwal
(74) *Attorney, Agent, or Firm* — McDonnell Boehnen Hulbert & Berghoff LLP

(57) ABSTRACT

An example method includes determining, by a controller of an image capture system, a plurality of sets of exposure parameter values for one or more exposure parameters. The plurality of sets of exposure parameter values are determined at an exposure determination rate. The method further includes capturing, by an image capture device of the image capture system, a plurality of images. Each image of the plurality of images is captured according to a set of exposure parameter values of the plurality of sets of exposure parameter values. The method also includes sending, by the controller of the image capture system to an image processing unit, a subset of the plurality of images. Each subset of images is sent at a sampling rate, and the sampling rate is less than the exposure determination rate.

20 Claims, 8 Drawing Sheets

SYSTEMS AND METHODS FOR SAMPLING IMAGES

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to image processing systems. In one example, the present application describes a method. The method includes determining, by a controller of an image capture system, a plurality of sets of exposure parameter values for one or more exposure parameters. The plurality of sets of exposure parameter values are determined at an exposure determination rate, where the exposure determination rate includes a rate at which captured images are processed by the controller to determine each set of exposure parameter values. The method further includes capturing, by an image capture device of the image capture system, a plurality of images. Each image of the plurality of images is captured according to a set of exposure parameter values of the plurality of sets of exposure parameter values. The method also includes sending, by the controller of the image capture system to an image processing unit, a subset of the plurality of images. Each subset of images is sent at a sampling rate, and the sampling rate is less than the exposure determination rate.

In another example, the present application describes a system. The system includes at least one image capture device, an image processing unit, and a controller having one or more processors. The system further includes a non-transitory computer readable medium and program instructions stored on the non-transitory computer readable medium and executable by the one or more processors to perform functions. The instructions are executable to cause the at least one image capture device to capture a plurality of images. The instructions are further executable to determine a plurality of sets of exposure parameter values for one or more exposure parameters that correspond to the plurality of images. The plurality of sets of exposure parameter values are determined at an exposure determination rate, where the exposure determination rate includes a rate at which the plurality of images are processed by the controller to determine each set of exposure parameter values. The instructions are also executable to send, to the image processing unit, a subset of the plurality of images, wherein the subset of images is sent at a sampling rate, and wherein the sampling rate is less than the exposure determination rate.

In yet another example, the present application describes a non-transitory computer readable medium. The non-transitory computer readable medium has stored thereon instructions executable by one or more processors to cause a computing system to perform functions. The functions include determining, by a controller of an image capture system, a plurality of sets of exposure parameter values for one or more exposure parameters. The plurality of sets of exposure parameter values are determined at an exposure determination rate, where the exposure determination rate includes a rate at which captured images are processed by the controller to determine each set of exposure parameter values. The functions further include capturing, by an image capture device of the image capture system, a plurality of images. Each image of the plurality of images is captured according to a set of exposure parameter values of the plurality of sets of exposure parameter values. The functions also include sending, by the controller of the image capture system to an image processing unit, a subset of the plurality of images. Each subset of images is sent at a sampling rate, and the sampling rate is less than the exposure determination rate.

In an additional example, the present application describes a system. The system includes means for determining a plurality of sets of exposure parameter values for one or more exposure parameters. The plurality of sets of exposure parameter values are determined at an exposure determination rate, where the exposure determination rate includes a rate at which captured images are processed by the controller to determine each set of exposure parameter values. The system further includes means for capturing a plurality of images. Each image of the plurality of images is captured according to a set of exposure parameter values of the plurality of sets of exposure parameter values. The system also includes means for sending, to an image processing unit, a subset of the plurality of images. Each subset of images is sent at a sampling rate, and the sampling rate is less than the exposure determination rate.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
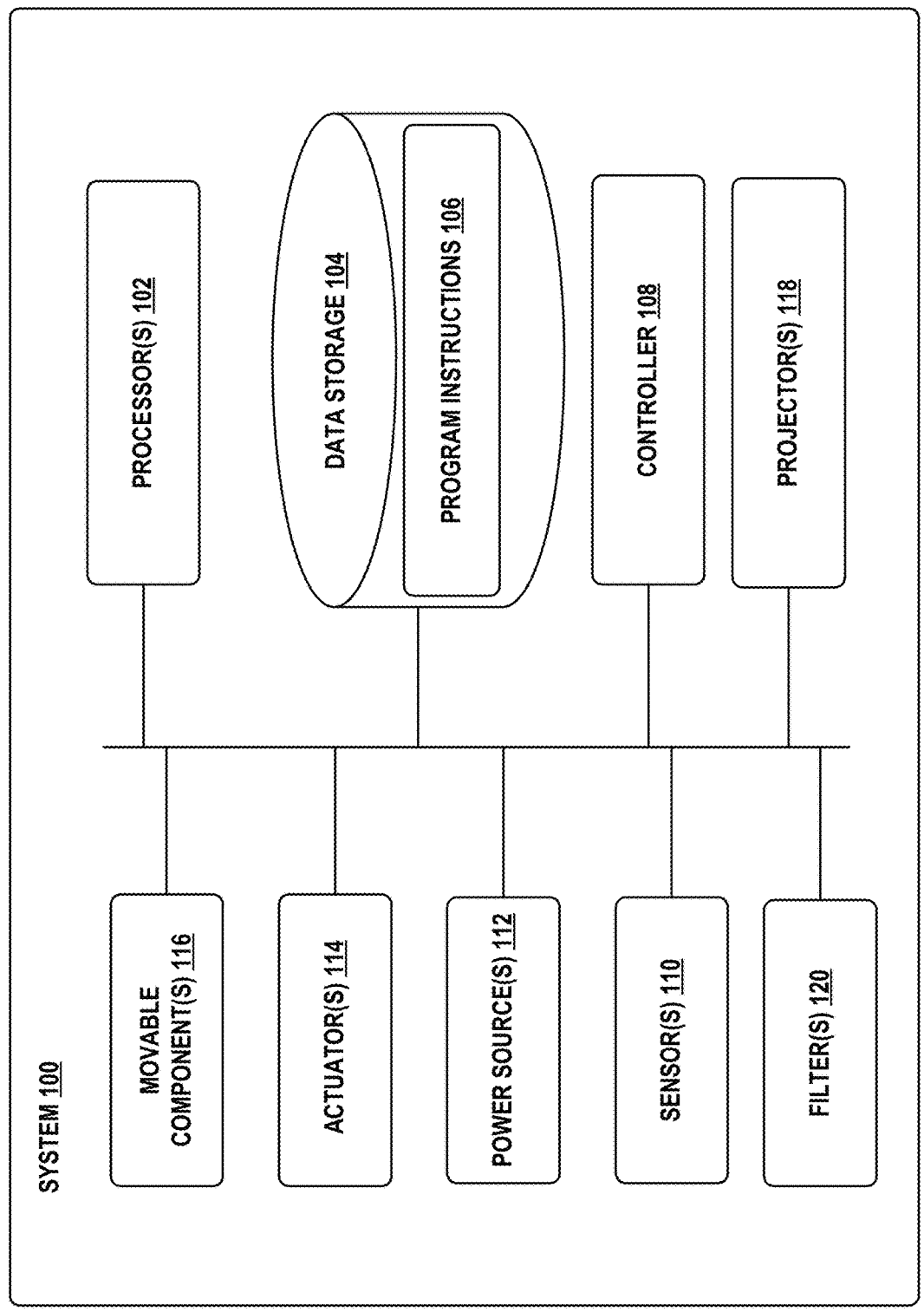
FIG. 1 illustrates a configuration of a robotic system, according to example embodiments.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

The present application discloses implementations that relate to image processing systems. An example system includes an image capture system and an image processing unit. The image capture system includes an image capture device and a controller. The image capture device is configured to capture images at a capture rate, and the controller is configured to determine a set of one or more exposure parameter values for each of the captured images at an exposure determination rate. The images are sampled by the controller and sent to the image processing unit at a sampling rate that is less than the exposure determination rate. The term "sampling rate" refers to a number of images that are sent by the controller to the image processing unit per unit time. Accordingly, only a subset of the captured images are processed by the image processing unit. Various types of image processing operations may be performed by the image processing unit on the sampled images, and the sampling rate may be determined based on an amount of time associated with performing the operations.

Many systems use image processing systems to operate effectively. For instance, a robot may use an image processing system to recognize objects in an environment of the robot. Recognizing such objects may allow the robot to navigate within the environment, or to interact with the detected objects. Thus, a robot may rely on the accuracy of such image processing operations. Further, a robot may need to perform such operations quickly.

A number of factors can affect the accuracy and speed of image processing operations. For example, dim photos may reduce the accuracy of color detection operations and off-focus or blurry images may increase the time required to perform edge detection operations. To account for this, image processing systems may perform pre-processing on images, alter parameters used when capturing images, or may only allow the capture of images in certain conditions. One such example can include performing auto-exposure on images. This allows subsequent operations to be performed more quickly and accurately because the subsequent operations use images with desired histogram distributions. Auto-exposure operations are also computationally simple relative to other operations, such as object detection operations or deblur operations, so auto-exposure operations can be performed quickly.

Thus, various embodiments described herein include an image capture system that performs auto-exposure on a plurality of captured images. Each of the plurality of captured images is captured according to a set of one or more exposure parameter values determined by a controller of the image capture system. The controller can use pixel statistics of one or more prior images when determining the set of exposure parameter values for a captured image. Because determining the set of exposure parameters can be performed quickly, an image capture device of the image capture system can capture images at a high rate, while the controller determines the set of exposure parameters for each captured image.

An image processing unit may perform image processing operations that are more computationally taxing than an auto-exposure operation. Accordingly, such operations may take longer than it takes the controller to determine sets of exposure parameter values. It therefore may be impracticable for the image processing unit to perform image processing operations on each of the plurality of captured images. But capturing images at a high rate allows the controller to determine sets of exposure parameter values that more effectively represent the scene captured in the images. Accordingly, the controller can sample some, but not all, of the images from the plurality of images captured by the image capture device to send to the image processing unit. This allows the sampled images to more effectively represent a scene, while still giving the image processing unit time to perform operations on an image before receiving another image. Further, because the controller does not send each captured image, less communication bandwidth is used. This can allow for more efficient communications between the controller and the image processing unit, particularly where the controller wirelessly communicates with the image processing unit.

In some examples, additional steps may be taken to ensure that an image received by the image processing unit is fit for image processing operations. For example, a pre-processing unit may be included within the system that performs intermediate processing of an image. For example, the pre-processing unit can sample images in parallel with the image processing unit and determine a white level or focus level for those images. The pre-processing unit, or the controller of the image capture system, can then determine which images to send to the image processing unit based on the determined white level or focus level. In some examples, the pre-processing unit and the controller of the image capture device can be one and the same.

In some examples, an image processing system can be part of another system, such as a robotic system. The robotic system may include a robot controller that determines actions for the robot, which may affect the operations performed by the image capture system. For example, the robot controller might determine a motion command for a robot that makes it more likely that the scene captured by the image capture device will experience a large change.

In some embodiments, the sampling rate is constant (e.g., the controller samples and sends every nth captured image to the image processing unit). In other embodiments, the controller of the image capture system can also alter the sampling rate based on its own determinations. For instance, the controller can determine a large change in the scene based on an error term calculated from pixel statistics in various images. Such an error term may be indicative of a large shift in histogram data between two or more captured images. The controller can wait for the error term to return to a normal level before sending an image to the image processing unit.

In further examples, the image processing unit can also cause the controller to alter the sampling rate with a feedback signal. For instance, the image processing unit can send a signal to the controller each time it completes an image processing operation such that the sampling rate is a variable rate consistent with an image processing operation time for each image. The image processing unit can also change the sampling rate based on a type of image processing operation it is to perform. For instance, the image processing unit may receive a command signal that instructs it to perform object detection operations for a first period, and to perform deblur operations in addition to the object detection operations for a second period. The image processing unit can set a first sampling rate during the first period and set a second sampling rate during the second period, where each sampling rate is commensurate with an expected image processing time.

In addition to variable sampling rates based on actions of a robot, feedback from an image processing unit, feedback from a pre-processing unit, or determinations by the controller of the image capture system, various exposure parameter values can be altered based on such inputs. For example, an exposure duration or gain associated with a set of exposure parameters can be altered based on a type of image processing operation performed by the image processing unit, or based on a type of action carried out by a robot.

These and various other embodiments are described herein. It should be understood that, though an image processing system is described in the context of a larger robotic system, this system can be a standalone system included within a single unitary device, such as a video recording device, a camera, or an imager. Further, the image processing system may be included within other types of systems such as in a manufacturing system, automotive vehicle system, or cellular handheld device system.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. Example Robotic Systems

FIG. 1 illustrates an example configuration of a robotic system that may be used in connection with the implementations described herein. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
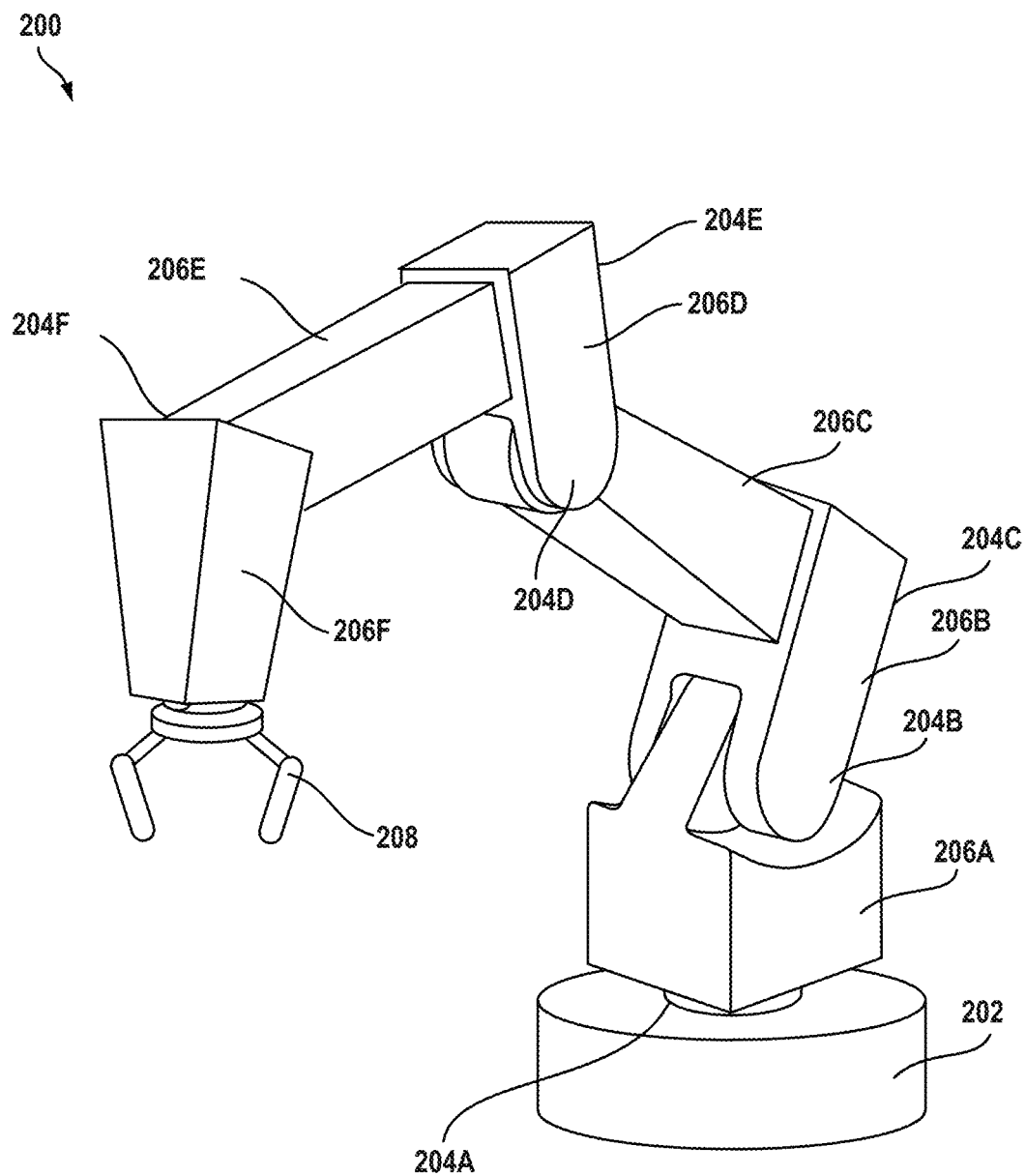
FIG. 2 illustrates a robotic arm, according to example embodiments.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. Example Image Processing Systems

Figure 3:
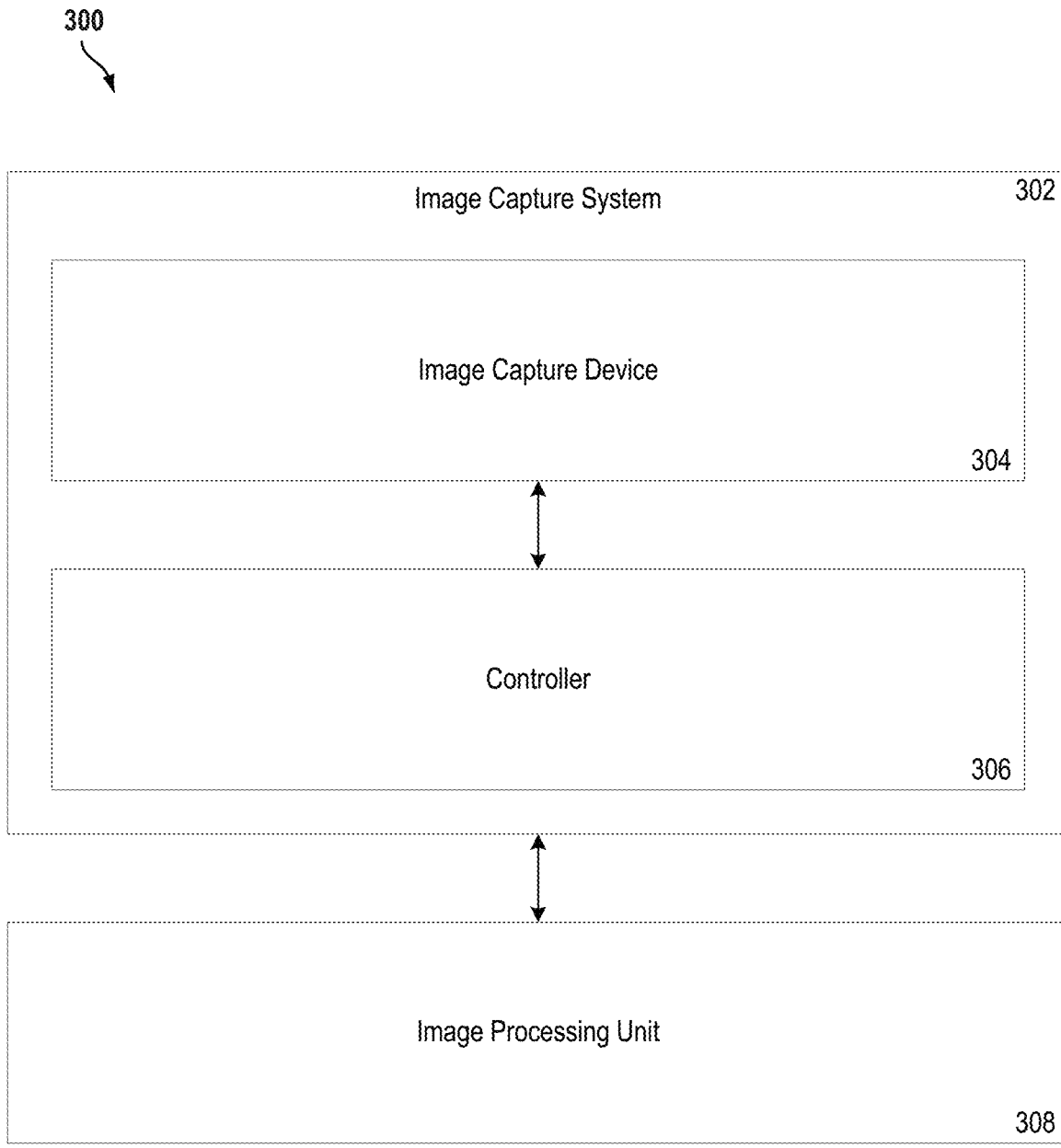
FIG. 3 illustrates a configuration of an image processing system, according to example embodiments.

FIG. 3 illustrates a configuration of an image processing system 300, according to example embodiments. Image processing system 300 includes an image capture system 302 having an image capture device 304 and a controller 306. The term "image capture device" refers to an optical instrument for recording or capturing images. The term "controller" refers to one or more processors configured to control the operation of the image capture device. Image capture device 304 and controller 306 are depicted as communicating back and forth. For example, controller 306 can send control signals indicative of a capture rate at which image capture device 304 is to capture a plurality of images, while image capture device 304 can send the plurality of images to controller 306. Controller 306 can determine sets of one or more exposure parameter values for image capture device 304 to use when capturing images. For instance, controller 306 can receive a first image, determine a set exposure parameter values based on pixel statistics of the first image, and send the set of exposure parameter values to image capture device 304. The term "exposure parameter" refers to at least one of an aperture, gain, or exposure duration used by the image capture device when capturing an image. The set of exposure parameter values can include at least one of an exposure duration value, gain value, and/or an aperture value for capturing a subsequent image. Image capture device 304 can capture a second image according to the determined set of exposure parameter values.

As controller 306 determines the sets of exposure parameter values, controller 306 can also determine error terms for each captured image. The term "error term" refers to a level of change between pixel statistics associated with two or more captured images. For example, controller 306 can determine a level of variance between a first histogram associated with a first image and a second histogram associated with a second image. A large variance may indicate a sudden change in lighting within the environment. Though successively determined sets of exposure parameter values after the second image is captured may adjust for this change, it may take several images for controller 306 to reach a stable desired histogram. Thus, controller 306 may wait until the error term associated with a given image falls within an error term threshold before sampling that image for processing by image processing unit 308.

Image processing system 300 also includes an image processing unit 308. Image processing unit 308 can receive a subset of the plurality of images captured by the image capture system and perform image processing operations on the captured images. Image processing unit 308 and image capture system 302 are depicted as communicating back and forth. For instance, controller 306 of image capture system 302 can send an image to image capture system 308, and image capture system 308 can send a feedback signal to controller 306. The feedback signal may indicate to controller 306 that image capture system 308 is ready to receive another image.

Controller 306 can send images to image processing unit 308 at a sampling rate. In some examples, controller 306 can send images to image processing unit 308 in a periodic and consistent manner. In such examples, image capture device 304 may capture images at a capture rate that corresponds to an exposure determination rate of controller 306. The term "exposure determination rate" refers to a rate at which captured images are processed by the controller to determine sets of exposure parameter values. For example, controller 306 can process a captured image to determine a value for one or more of an exposure duration, gain, or aperture to use when capturing a subsequent image, and the exposure determination rate can refer to the rate at which such processing occurs. More specifically, the exposure determination rate may be the rate at which the controller determines pixel statistics for one or more captured images and determines sets of exposure parameters based at least on the pixel statistics. The exposure determination rate may be a multiple of the sampling rate, such that, for a plurality of images captured by image capture device 302, every nth image is sent to image processing unit 308. For instance, the exposure determination rate could be thirty or sixty frames per second, while the sampling rate could be five or ten frames per second.

Controller 306 may determine the sets of one or more exposure parameter values in accordance with the capture rate. For example, controller 306 may receive a first image, determine pixel statistics for the first image, and determine a set of exposure parameter values for image capture device 304 to use when capturing a second image. Controller 306 can determine the set of exposure parameter values for the second image based at least on the determined pixel statistics for the first image. For example, controller 306 can compare histogram data represented in the pixel statistics to a desired histogram, and can alter one or more exposure parameter values used to capture the first image such that the pixel statistics from the second image more closely match the desired histogram.

In other examples, the sampling rate can be a variable rate. For example, each time image processing unit 308 completes an image processing operation, image processing unit can send a prompt to controller 306. Thus, controller 306 can receive a plurality of prompts that correspond to a subset of the plurality of images. Controller 306 can send the subset of images one at a time as the prompts are received. Accordingly, as time for performing an image processing operation changes over time, so too will the sampling rate. In other examples, controller 306 or image processing unit 308 can alter the sampling rate based on a number and/or type of image processing operations to be performed on an image or images. For instance, image processing unit 308 may receive a command to perform object detection operations for a first period, and to perform deblur operations in addition to the object detection operations for a second period. Image processing unit 308 can set a first sampling rate during the first period and set a second sampling rate during the second period, where each sampling rate corresponds to an expected image processing time for the image processing operations. Image processing unit 308 can send a feedback signal that indicates the different sampling rates, and controller 306 can change the sampling rate based on the feedback signal. Other examples of variable sampling rates are possible as well.

One or more exposure parameter values can be altered similarly to the sampling rate. For instance, an exposure duration, gain, or aperture used to capture one or more images of the plurality of images can be altered based on a feedback signal received from image processing unit 308. In some examples, image processing unit 306 can determine that one or more images sampled from the plurality are too bright or too dim, and can send a feedback signal to controller 306 that indicates that different exposure parameters should be used for forthcoming images. Such feedback signals can be sent prospectively as well. For example, image processing unit 308 may determine a type of image processing operation to be performed on forthcoming sampled images and can send a feedback signal that indicates desired characteristics for the forthcoming sampled images. For instance, where a color thresholding operation is forthcoming, image processing unit 308 can send a feedback signal indicating that a gain greater than one should be applied to a first color channel, while a gain less than one should be applied to a second color channel and a third color channel. Other examples of feedback from image processing unit 308 are possible as well.

In the present example, controller 306 and image processing unit 308 are depicted as being separate, but in some examples they may be part of a single unitary device, such as a video capture device, a camera, or an imager. In some examples, image processing system 300 may be included as a component of a larger system, such as a robotic system. Separating image capture device 304 and controller 306 from image processing unit 308 as depicted in FIG. 3 may reduce bandwidth usage within image processing system 300 because not all of the images captured by image capture device 304 are sent for processing. In particular, where controller 306 communicates wirelessly with image processing system 308, separating controller 306 from image processing system 308 in this fashion may allow for efficient use of available communication bandwidth by sending only a subset of available images.

Figure 4:
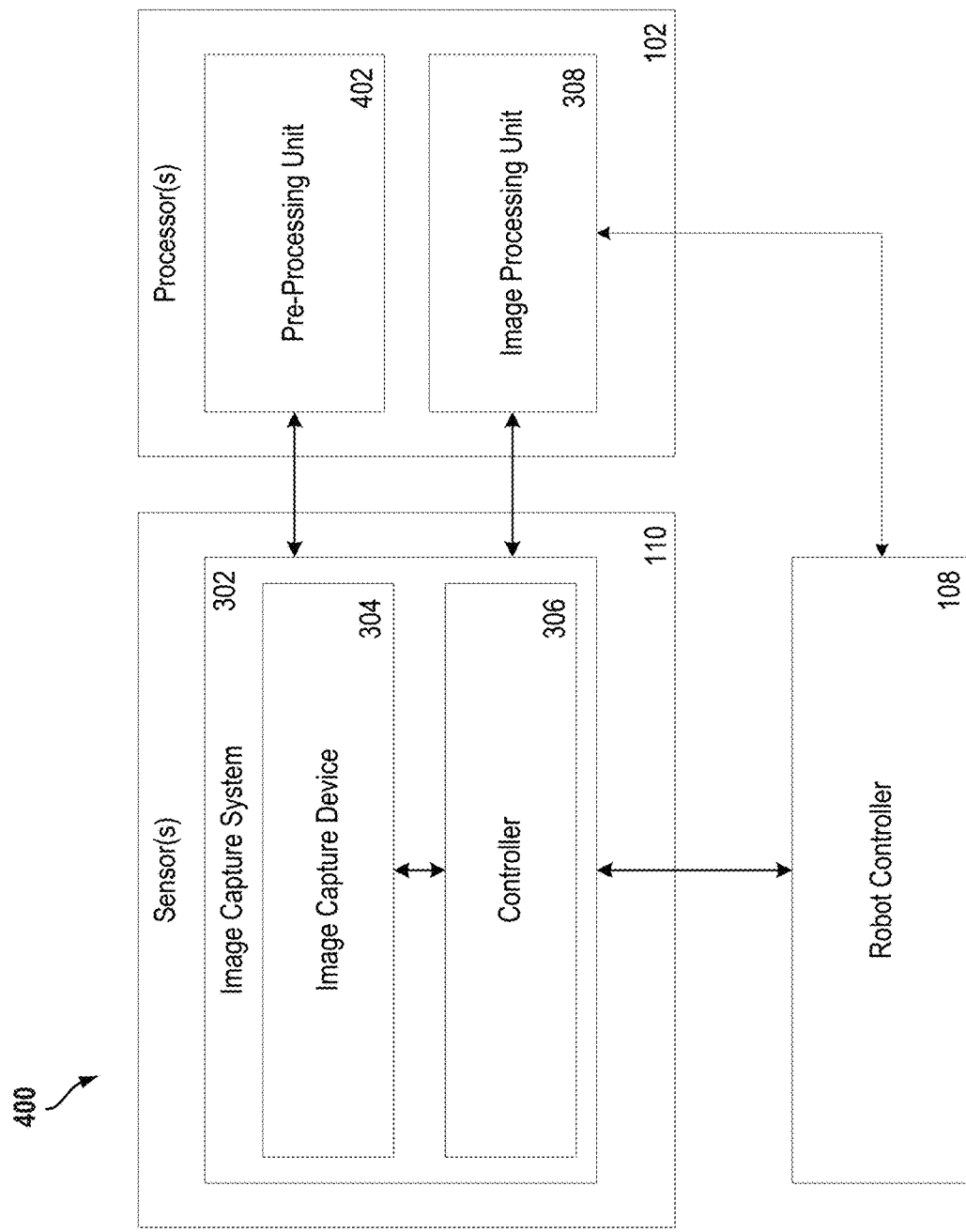
FIG. 4 illustrates another configuration of an image processing system, according to example embodiments.

FIG. 4 illustrates a configuration of another image processing system 400, according example embodiments. Image processing system 400 is incorporated into a robotic system. The robotic system may be similar or identical to system 100 depicted in FIG. 1. As illustrated in FIG. 4, image capture system 302, described above with regard to FIG. 3, is included within sensors(s) 110 described above with regard to FIG. 1. Image processing unit 308 is similarly incorporated into processor(s) 102. An additional component, pre-processing unit 402, is similarly incorporated into processor(s) 102. For purposes of clarity, controller 108 depicted in FIG. 1 has been re-labelled robot controller 108.

As described above with regard to FIG. 3, image capture system 302 includes image capture device 304 and controller 306. Image capture system 302 and image processing unit 308 may interact within image processing system 400 in substantially the same way described above. However, additional factors may contribute to the operation of these components in image processing system 400. For instance, robot controller 108 can send commands to either or both of controller 306 and image processing unit 308 that affect the sampling rate. In one such example, robot controller 108 can be configured to plan successive actions of a robot, such as the robot described above with regard to FIG. 2. The planned actions may require image processing unit 308 to perform different image processing operations. Robot controller 108 can send to controller 106 a sequence of commands to change the sampling rate based on the planned actions and, in parallel, send image processing unit 308 a sequence of commands to perform various image processing operations at different times. In another example, robot controller 108 can send a sequence of commands to image processing unit 308 only, image processing unit 308 can send a feedback signal to controller 306, and controller 306 can change the sampling rate based on the feedback signal. Other ways of carrying out the image processing operations are possible as well.

Controller 306 can alter the sampling rate in other ways as well. For instance, in a mapped environment, image processing unit 308 may be expected to carry out different image processing operations in different locations within the environment. Accordingly, controller 306 can alter the sampling rate based on a location and/or orientation of the robot within the environment. Controller 306 may receive such location or orientation information from robot controller 108, from another sensor of sensor(s) 110, or from another component of system 100 described above with regard to FIG. 1.

Image processing system 400 also includes pre-processing unit 402. Pre-processing unit 402 can also be configured to alter which images are sent to image processing unit 308. For example, pre-processing unit 402 can sample images from a plurality of images captured by image capture device 304. Pre-processing unit 402 can determine a white level or focus level for the sampled images. The term "white level" refers to the intensity of pixels in a captured image. The term "focus level" refers to an identified in-focus portion or out-of-focus portion of a captured image. Different white levels or focus levels may be more suitable than others for processing by the image processing unit 308. Accordingly, where controller 306 receives a prompt from image processing unit 308 to send an image, controller 306 can select an image to send based on the white level or focus level determined by pre-processing unit 402. Though pre-processing unit 402 is depicted as being separate from controller 306, it should be understood that, in some examples, pre-processing unit 402 and controller 306 might be one and the same. That is, controller 306 can determine a white level and/or a focus level for some or all of the plurality of images in addition to determining sets of one or more exposure parameter values for the plurality of images.

Figure 5:
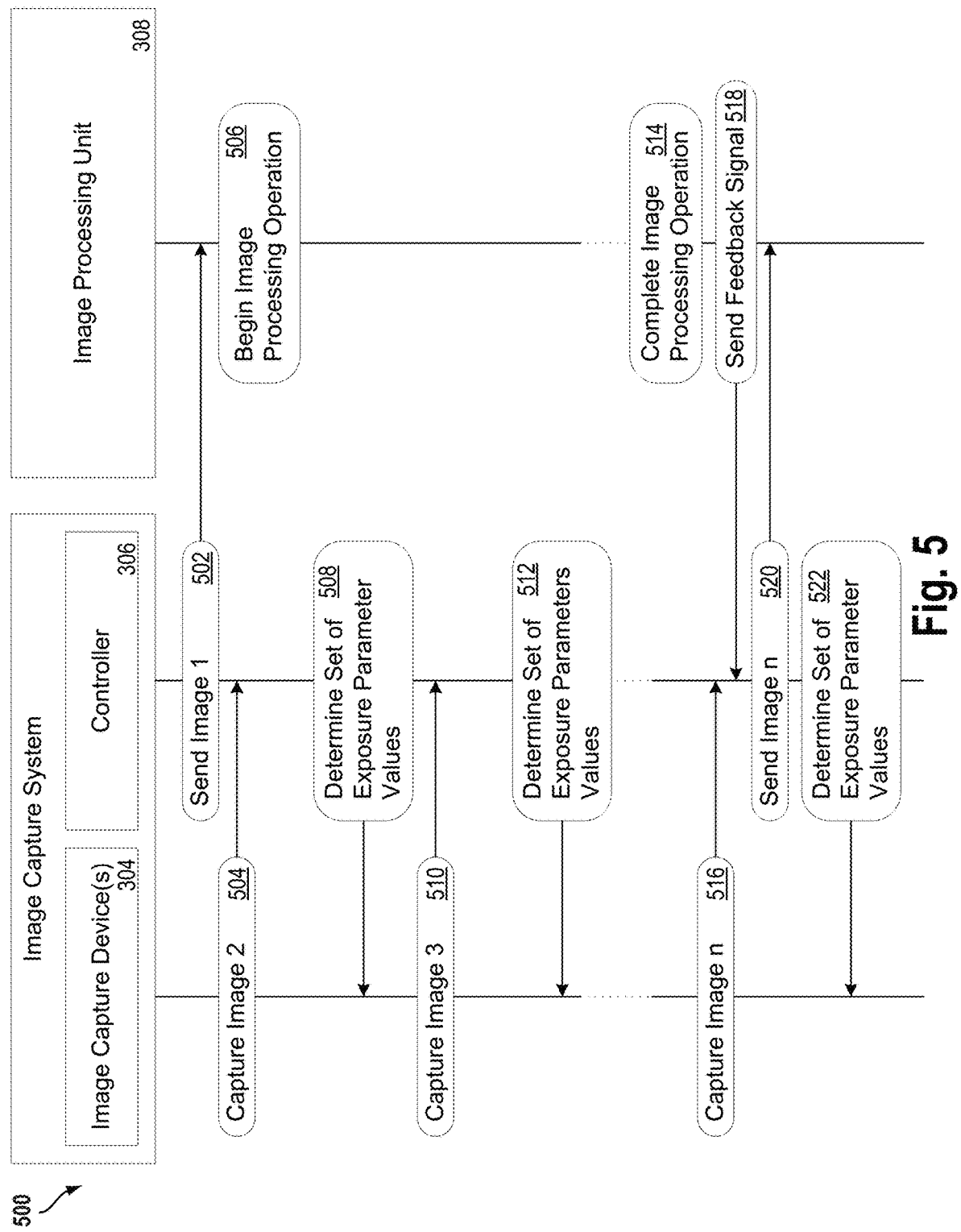
FIG. 5 illustrates a timing diagram for an image processing system, according to example embodiments.

FIG. 5 illustrates a timing diagram 500 for an image processing system, according to example embodiments. In FIG. 5, image capture device 304, controller 306, and image processing unit 308 are configured to perform different operations at different times.

At time 502, controller 306 is configured to send a first image to image processing unit 308. Though not depicted in FIG. 5, it should be understood that image capture device 304 first captured the first image. In timing diagram 500, image capture device 304 captures images at a constant, or substantially constant, rate. Image capture device 304 captures a second image at time 504, a third image at time 510, and an nth image at time 516.

After receiving the first image, image processing unit 308 begins performing an image processing operation on the first image at time 506. As illustrated in timing diagram 500, the image processing time may take significantly longer than it takes controller 306 to determine a set of one or more exposure parameter values. Controller 306 determines a set of exposure parameter values for the third image at time 508, and determines a set of exposure parameter values for a fourth image at time 512 before image processing unit 308 completes the image processing operation on the first image at time 514.

Once image processing unit 308 has completed the image processing operation, it sends a feedback signal at time 518. In some examples, the feedback signal simply includes a prompt to send another image. In other examples, the feedback signal can include an indication to change the sampling rate, an indication of a type of image forming operation to be performed on another image, or an indication of target parameters for forthcoming images. For instance, image processing unit 308 can determine that an image processing operation took too long because of an improper focus level, or that the operation was unsuccessful because an image was overexposed. In response, controller 306 can alter a threshold for the focus level, or constrain an error term threshold for determining the set of exposure parameter values to ensure that forthcoming images are better suited for performance of image processing operations.

After receiving the feedback signal, controller 306 sends an nth image at time 520, and continues to determine a set of exposure parameter values at time 522. In some examples, operation of the image processing system may continue in much the same way. In other examples, timing operation of controller 306 and image processing unit 308 can change based on external inputs.

Further, it should be understood that timing diagram 500 is a simplified illustration of communications between controller 306 and image processing unit 308. Sending the images may further include exchanging acknowledgement signals between controller 306 and image processing unit 308. Sending the images may also include modulating or otherwise transforming image data. For instance, sending the image may include wirelessly sending the image data to the image processing unit according to a modulation scheme. In another example, controller 306 and image processing unit 308 may send signals according to a controller area network (CAN) protocol. Other such protocols and communication schemes are possible.

IV. Additional Embodiments

Figure 6:
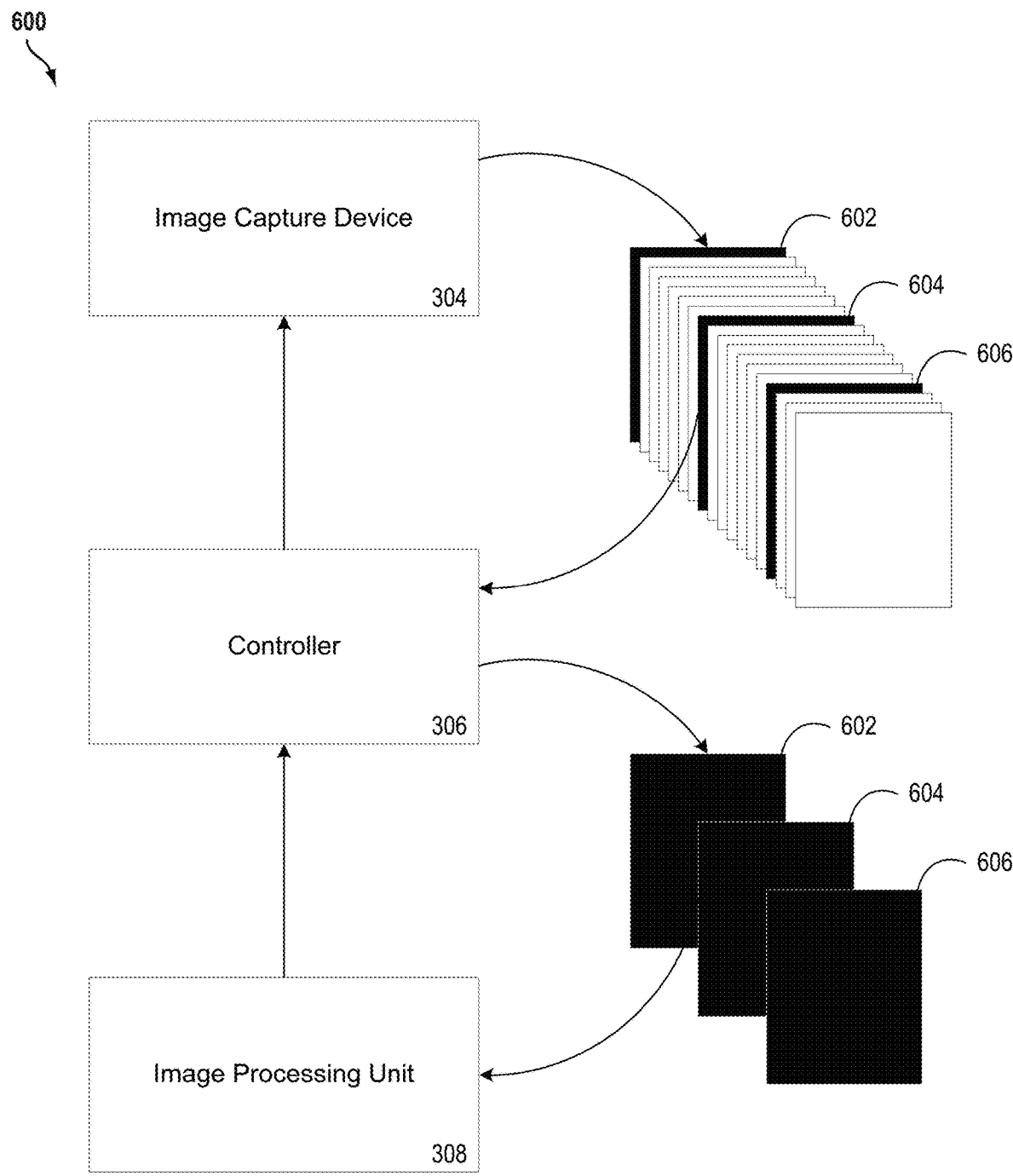
FIG. 6 illustrates operation of an image processing system, according to example embodiments.

FIG. 6 illustrates operation of an image processing system 600, according to example embodiments. FIG. 6 illustrates an image capture device 304, a controller 306, and an image processing unit 308. FIG. 6 also illustrates a plurality of images captured by the image capture device 304, which include images 602, 604, and 606, which are sampled by the image processing unit. The depicted images are captured at different times, such that image 602 is captured at a first time, image 604 is captured at a second time that is later than the first time, and image 606 is captured at a third time that is later than the second time.

In some examples, image processing system 600 can be used in a robotics context. Image capture device 304 can capture a plurality of images at a capture rate commensurate with an exposure determination rate of the controller 306. Controller 306 can communicate with a robot controller, such as controller 108 described above with regard to FIG. 1. Controller 306 can receive information related to one or more actions of the robot, and determine a sampling rate at which to send a subset of the plurality of images to image processing unit 308 based on the one or more actions of the robot. Each of the one or more actions may be related to an image processing performance time. For instance, an action that causes the robot to move may cause a large change in the scene captured by the image capture device. Image processing unit 308 may perform more image processing operations due to the large change in scene, and may accordingly take a longer time to perform the image processing operations. Accordingly, controller 306 may adjust the sampling rate based on the action of the robot. In other examples, image processing unit 308 may send a feedback signal that indicates to controller 306 that the sampling rate should change. In FIG. 6, every seventh image is sampled, therefore, this example scenario may depict a system where the sampling rate is constant, or where image processing unit 308 is taking a similar amount of time to perform operations of each of sampled images 602, 604, and 606.

In a robotics context, the sampling rate may be adjustable by controller 306 based on a location of the robot. For instance certain image processing operations may be associated with different locations in an environment of the robot. When a robot controller, such as controller 108 described above determines a location of the robot has changed, it can send signals to controller 306, and controller 306 can alter the sampling rate based on the command signals. Other examples are possible in a robotics context as well.

Sets of exposure parameter values can be adjustable by controller 306 in a robotics context as well. For example, for a given set of exposure parameters, controller 306 can alter one or more of an exposure duration, gain, or aperture based on an action of the robot or based on a current location of the robot.

In further examples, image processing system 600 may be used in an automotive context. That is, image capture device 304 and controller 306 may be included within a vehicle, such as an autonomous vehicle. Image processing unit 308 may be tasked with recognizing other vehicles in an environment of the vehicle, identifying symbols or text in road signs, perceiving pedestrians, animals, or other obstructions in the environment, detecting blur directionality associated with a sudden movement of the vehicle, or other related image processing operations. Image processing unit 308 may be included within the vehicle, or may be remote from the vehicle. In examples where image processing unit 308 is remote from the vehicle, controller 306 may communicate with image processing unit 308 wirelessly.

In an automotive context, controller 306 may interact with a vehicle controller. Similarly, controller 306 may interact with additional sensors of the vehicle that provide controller 306 with information relevant to setting a sampling rate at which to send a subset of images to image processing unit 308. For example, proximity sensors of the vehicle may signal to controller 306 that an obstruction is within a threshold distance. Controller 306 can determine that image processing unit 308 will require more time to process each image based on the signal, and can account for this by lowering the sampling rate. In other examples, a vehicle controller can send a control signal to controller 306 based on a user input. Other examples in an automotive context are possible as well.

In additional examples, system 600 can be used in a handheld device context. In this example, image capture device 304 and controller 306 can be included within a handheld device. Image processing unit 308 can be included within the handheld device or be remote from the handheld device. Image processing operations on images captured by image capture device can include facial recognition operations, object detection operations, high dynamic range (HDR) operations, filtering operations, or others. Other examples in a handheld device context are possible as well.

Figure 7:
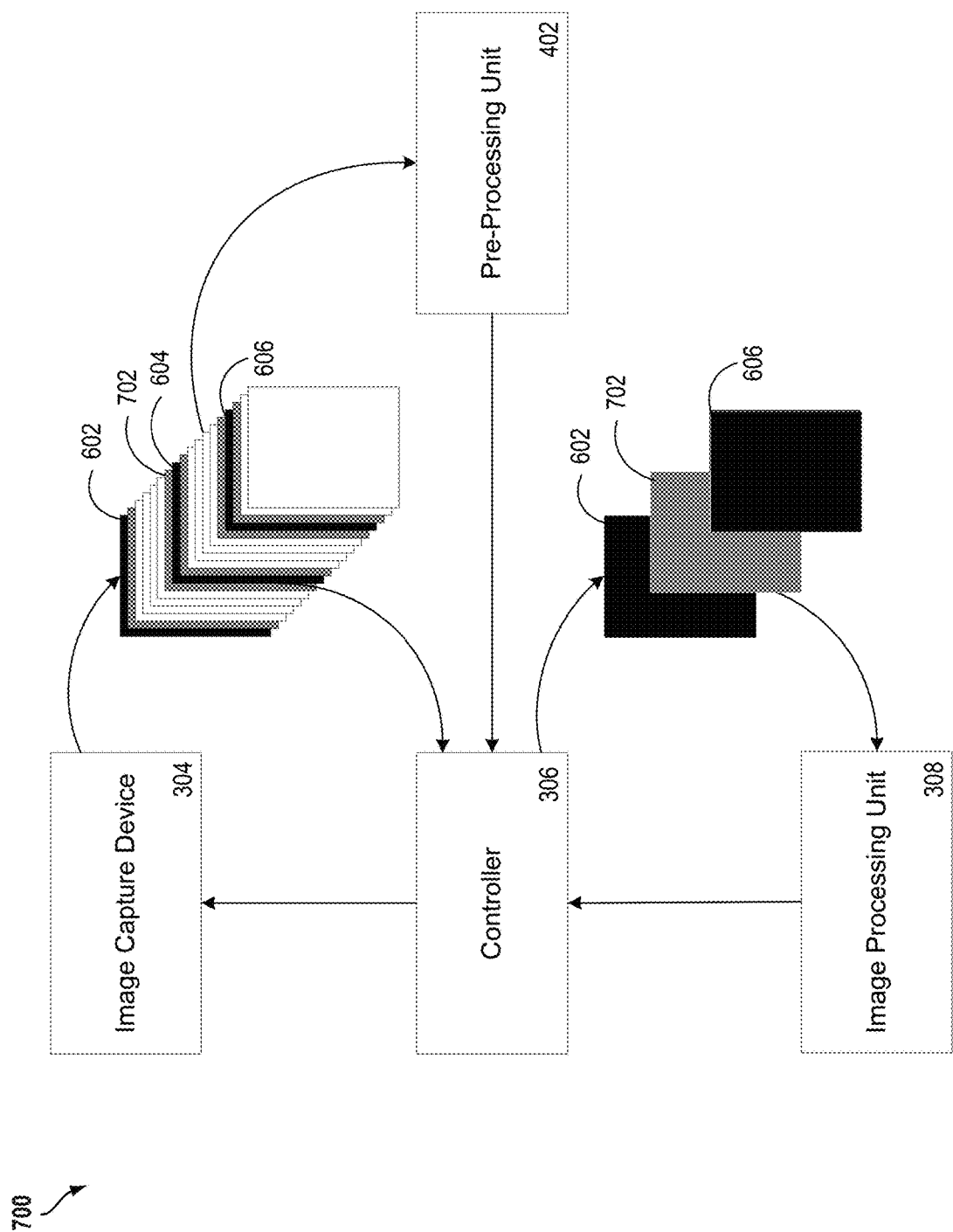
FIG. 7 illustrates operation of another image processing system, according to example embodiments.

FIG. 7 illustrates operation of another image processing system 700, according to example embodiments. In FIG. 7, system 700 includes image capture device 304, controller 306, and image processing unit 308. System 700 additionally includes pre-processing unit 402. Pre-processing unit 402 may be configured to perform image processing operations in parallel with image processing unit 308, and may help determine the sampling rate.

In some examples, one or more additional image capture devices may be used in addition to image capture device 304. For instance, image capture device 304 may be a first image capture device configured to capture first images of a plurality of images at a first capture rate, and a second image capture device may capture second images at a second capture rate. Controller 306 may determine separate sets of one or more exposure parameter values for each image capture device. Having two image capture devices simultaneously capture images can allow for a faster overall capture rate, which in turn allows controller 306 to determine effective set of exposure parameter values more quickly. In such examples, sending a subset of the plurality of images may include selecting the subset of images from the first images and the second images. The first images and second images can be captured according to different parameters, and so controller 306 may sample corresponding images from the first image capture device and the second image capture device and send the corresponding images to image processing unit 308. For example, the first image capture device may focus on a first portion of a scene, the second image capture device may focus on a second portion of the scene, and image processing unit 308 may be configured to perform HDR operations on corresponding images to form a combined image that is in focus at both portions of the scene.

In some examples, pre-processing unit 402 can be configured to determine a white level or focus level associated with a plurality of images. Image processing unit 308 may send a plurality of prompts to receive images from the plurality of images. In turn, controller 306 may select an image from the plurality based on the determined white level and/or focus level. In FIG. 7, the plurality of images captured by image capture device 304 includes images 602, 702, 604, and 606. Of these, controller 306 samples and sends images 602, 702, and 606 to image processing unit 308. These may be selected from other images of the plurality that are captured within a time threshold of each prompt received from image processing unit 308. For example, images 702 and 604 may be within the time threshold. In the present example, image 702 has a more appropriate white level and/or focus level than image 604, and so image 702 is sent to image processing unit 308.

Pre-processing unit 402 can additionally or alternatively determine a level of change in the environment. For instance, pre-processing unit 402 may determine a threshold percent change in a color (e.g. red, green, or blue) in a scene captured by two or more images of the plurality of images. Such a change may be indicative of additional image processing operations for image processing unit 308 to perform. Pre-processing unit 402 may send a feedback signal to controller 306 based on the level of change in the scene, and controller 306 can change the sampling rate based on the feedback signal.

In other examples, pre-processing unit 402 or image processing unit 308 can determine a number and type of image processing operations to be performed on an image. Image processing unit 308 may identify four separate objects in image 602 and perform a deblur operation to the image. Based on these operations, and a performance time associated with the operations, image processing unit 308 can send a feedback signal to change the sampling rate. The sampling rate can be adjusted to allow enough time to perform identical or similar image processing operations on the next sampled image. Pre-processing unit 402 may likewise perform a preliminary check to determine which types of image processing operations image processing unit 308 will likely carry out once an image is sampled. Controller 306 can accordingly change the sampling rate before image processing unit 308 receives the image.

Though some of these example embodiments are discussed in a robotics context, an automotive context, or a handheld device context, it should be understood that any embodiments described herein can be applied in other contexts as well. Further, though image capture device 304, controller 306, image processing unit 308, and pre-processing unit 402 are depicted as being separate, it should be understood that any or all of these components might be included within a single unitary device. Still further, it should be understood that any of these embodiments may be carried out as a method, or may be effectuated using a non-transitory computer readable medium having instructions stored thereon, that when executed by one or more processors, perform a series of functions.

V. Example Operations

Figure 8:
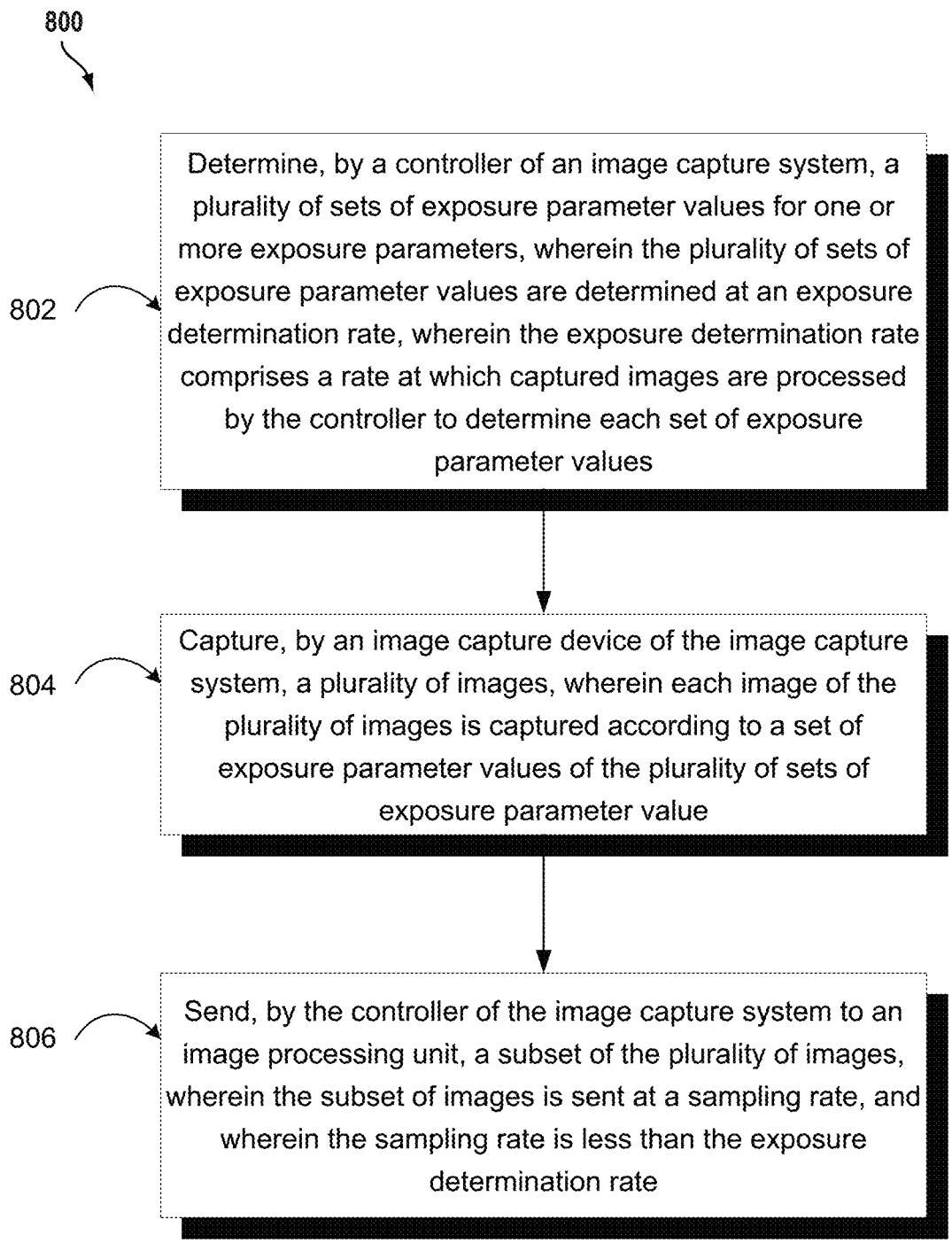
FIG. 8 is a block diagram of a method, according to example embodiments.

FIG. 8 illustrates an example block diagram of a method 800, according to an example embodiment. In some examples, method 800 may be carried out as part of a system. For example, blocks 802, 804, and 806 may be carried out as part of the system described above with regard to FIG. 1, FIG. 2, or FIG. 3, FIG. 4, FIG. 4, and FIG. 5. These steps may be carried out by the system components described above in conjunction with one or more processors executing program instructions stored on a non-transitory computer readable medium.

In other examples, the method may be carried out as part of a computing system. In these examples, a non-transitory computer readable medium may store instructions executable by one or more processors to cause the computing system to perform the blocks of the method.

In these examples, the one or more processors and non-transitory computer readable medium may perform the blocks remotely. In other examples, the one or more processors and non-transitory computer readable medium may carry out the method at a robot, vehicle, handheld device, or in another system context. In still other examples, portions of the method may be carried out remotely, while other portions may be carried out at the robot, vehicle, handheld device, or other system context.

Block 802 of the method 800 may be performed to determine, by a controller of an image capture system, a plurality of sets of exposure parameter values for one or more exposure parameters. The plurality of sets of exposure parameter values may be determined at an exposure determination rate, where the exposure determination rate includes a rate at which captured images are processed by the controller to determine each set of exposure parameter values.

Block 804 of method 800 may be performed to capture, by an image capture device of the image capture system, a plurality of images. Each image of the plurality of images may be captured according to a set of exposure parameter values of the plurality of sets of exposure parameter values.

Block 806 of method 800 may be performed to send, by the controller of the image capture system to an image processing unit, a subset of the plurality of images. The subset of images may be sent at a sampling rate, and the sampling rate may be less than the exposure determination rate. In some examples, sending the subset of the plurality of images at the sampling rate can include wirelessly sending the subset of images to the image processing unit.

In some examples, the exposure determination rate may be a multiple of the sampling rate. In these examples, a controller, such as controller 306 can send every nth image of the plurality of images to an image processing unit, such as image processing unit 308. In other examples, sending the subset of images at the sampling rate can include receiving, by the controller of the image processing system from the image processing unit, a plurality of prompts to send an image of the subset of the plurality of images. In these examples, each image of the subset may be sent in response to a received prompt. In other examples, method 800 may include receiving at a first time, by the controller of the image capture system from the image processing unit, a first prompt to send a first image of the plurality of images, receiving at a second time, by the controller of the image capture system from the image processing unit, a second prompt to send a second image of the plurality of images, and changing, by the controller of the image capture system, the sampling rate based on a difference between the first time and the second time.

In other examples, the image processing unit can provide feedback signals to the controller. For instance, method 800 can further include receiving, by the controller of the image capture system from the image processing unit, a feedback signal, and changing, by the controller of the image capture system, the sampling rate based on the received feedback signal.

In additional examples, the image capture system can be included within a robot. In these examples, the image processing unit may be configured to process images for a control system of the robot. In such examples, the method may also include the controller of the image capture system changing the sampling rate based on an action (e.g., a planned future action) of the robot.

Method 800 may include performing additional operations on the subset of images. For example method 800 may further the controller compressing the subset of images prior to sending the subset of the plurality of images. In other examples, method 800 may further include determining, by the controller of the image capture system, a plurality of exposure error terms that correspond to the plurality of images. In these examples, sending the subset of the plurality of images may be based on the determined plurality of exposure error terms. The controller may determine whether an error term falls within an error term threshold. If the error term falls within the error term threshold, the controller may send an image of the plurality of images that corresponds to the error term to the image processing unit. In still other examples, method 800 can also include determining a white level or a focus level of the plurality of images. In these examples, sending the subset of images may include selecting the subset of images from the plurality of images based on the determined white level or focus level.

Method 800 can also include altering one or more sets of exposure parameter values. For instance, method 800 can further include receiving, by the controller of the image capture system from the image processing unit, a feedback signal, and changing, by the controller of the image capture system, one or more sets of exposure parameter values of the plurality of sets of exposure parameter values based on the received feedback signal.

VI. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, by a controller of an image capture system associated with a robot, a plurality of sets of exposure parameter values for one or more exposure parameters, wherein the plurality of sets of exposure parameter values are determined at an exposure determination rate, wherein the exposure determination rate comprises a rate at which captured images are processed by the controller to determine each set of exposure parameter values;
   capturing, by an image capture device of the image capture system, a plurality of images, wherein each image of the plurality of images is captured according to a set of exposure parameter values of the plurality of sets of exposure parameter values;
   sending, by the controller of the image capture system to an image processing unit corresponding to at least one processor configured to process images for a control system of the robot, a subset of the plurality of images, wherein the subset of images is sent at a sampling rate, and wherein the sampling rate is less than the exposure determination rate; and
   changing, by the controller of the image capture system, the sampling rate based on an action of the robot.

2. The method of claim 1, wherein each set of the plurality of sets of exposure parameter values comprises a duration value and a gain value.

3. The method of claim 1, further comprising:
   receiving, by the controller of the image capture system from the image processing unit, a plurality of prompts to send an image of the subset of the plurality of images, wherein each image of the subset is sent in response to a received prompt.

4. The method of claim 1, further comprising:
   receiving, by the controller of the image capture system from the image processing unit, a feedback signal; and
   changing, by the controller of the image capture system, the sampling rate based on the received feedback signal.

5. The method of claim 1, further comprising:
   receiving, by the controller of the image capture system from the image processing unit, a feedback signal; and
   changing, by the controller of the image capture system, one or more sets of exposure parameter values of the plurality of sets of exposure parameters based on the received feedback signal.

6. The method of claim 1, wherein sending the subset of the plurality of images at the sampling rate comprises wirelessly sending the subset of images to the image processing unit.

7. The method of claim 1, further comprising, prior to sending the subset of the plurality of images, compressing the subset of images.

8. The method of claim 1, further comprising determining, by the controller of the image capture system, a plurality of exposure error terms that correspond to the plurality of images, wherein sending the subset of the plurality of images comprises determining that an error term falls within an error term threshold and sending an image that corresponds to the error term.

9. The method of claim 1, further comprising determining a white level or a focus level of the plurality of images, wherein sending the subset of images comprises selecting the subset of images from the plurality of images based on the determined white level or focus level.

10. A system comprising:
    at least one image capture device;
    an image processing unit corresponding to at least one processor configured to process images;
    a controller having one or more processors, wherein the controller is associated with a robot;
    a non-transitory computer readable medium; and
    program instructions stored on the non-transitory computer readable medium and executable by the one or more processors of the controller to:
    cause the at least one image capture device to capture a plurality of images;
    determine a plurality of sets of exposure parameter values for one or more exposure parameters that correspond to the plurality of images, wherein the plurality of sets of exposure parameter values are determined at an exposure determination rate, wherein the exposure determination rate comprises a rate at which the plurality of images are processed by the controller to determine each set of exposure parameter values;
    send, to the image processing unit, a subset of the plurality of images, wherein the subset of images is sent at a sampling rate, and wherein the sampling rate is less than the exposure determination rate; and
    adjust the sampling rate based on a location of the robot.

11. The system of claim 10, wherein the at least one image capture device, the controller, and the image processing unit are comprised within a single unitary device.

12. The system of claim 10, wherein the at least one image capture device comprises a first image capture device and a second image capture device, wherein the first image capture device is configured to capture first images of the plurality of images at a first capture rate, wherein the second image capture device is configured to capture second images at a second capture rate, and wherein the controller is configured to send the subset of the plurality of images by selecting the subset of images from the first images and the second images.

13. The system of claim 10, wherein the image processing unit is configured to determine a level of change in an environment of the system based on an image of the plurality of images and to send a feedback signal to the controller based on the level of change in the environment, wherein the program instructions are further executable by the one or more processors to change the sampling rate based on the feedback signal.

14. The system of claim 10, further comprising a pre-processing unit, wherein the pre-processing unit corresponds to at least one processor configured to determine a white level or a focus level for each image of plurality of images, and wherein the program instructions are further executable by the one or more processors to select the subset of images from the plurality of images based on the determined white level or focus level.

15. The system of claim 10, wherein the image processing unit is configured to determine a number and type of image processing operations to be performed on an image of the subset of images, and send a feedback signal to the controller based on the determined number and type of image processing operations, wherein the sampling rate is based on the feedback signal.

16. The system of claim 10, wherein the controller is a controller of the image capture system, wherein the robot comprises a robot controller, wherein the program instructions are further executable by the one or more processors of the controller of the image capture system to receive command signals from the robot controller and to change the sampling rate based on the received command signals.

17. The system of claim 10, wherein the image processing unit is configured to perform object detection operations on the plurality of images.

18. A non-transitory computer readable medium having stored therein instructions executable by one or more processors to cause a computing system to perform functions comprising:

determining, by a controller of an image capture system, a plurality of sets of exposure parameter values for one or more exposure parameters, wherein the plurality of sets of exposure parameter values are determined at an exposure determination rate, wherein the exposure determination rate comprises a rate at which captured images are processed by the controller to determine each set of exposure parameter values;

capturing, by an image capture device of the image capture system, a plurality of images, wherein each image of the plurality of images is captured according to a set of exposure parameter values of the plurality of sets of exposure parameter values;

sending, by the controller of the image capture system to an image processing unit corresponding to at least one processor configured to process images, a subset of the plurality of images, wherein the subset of images is sent at a sampling rate, and wherein the sampling rate is less than the exposure determination rate;

receiving, by the controller of the image capture system from the image processing unit, a feedback signal; and changing, by the controller of the image capture system, the sampling rate based on the received feedback signal.

19. The non-transitory computer readable medium of claim 18, the functions further comprising:

receiving, by the controller of the image capture system from the image processing unit, a feedback signal; and changing, by the controller of the image capture system, one or more sets of exposure parameter values of the plurality of sets of exposure parameters based on the received feedback signal.

20. The non-transitory computer readable medium of claim 18, wherein the image capture system is comprised within a robot, and wherein the image processing unit is configured to process images for a control system of the robot, the functions further comprising changing the sampling rate based on one or more of an action of the robot and a location of the robot.

* * * * *